United States Patent Office 3,050,482
Patented Aug. 21, 1962

3,050,482
REACTION PRODUCT OF A POLYHYDROXY COMPOUND AND A POLYISOCYANATE IN THE PRESENCE OF A VINYL-SUBSTITUTED HETEROCYCLIC NITROGEN BASE
Raymond L. Cobb and Paul S. Hudson, Bartlesville, Okla., assignors to Phillips Petroleum Company, a corporation of Delaware
No Drawing. Filed Aug. 3, 1959, Ser. No. 831,457
12 Claims. (Cl. 260—23)

This invention relates to thermosetting compositions. In another aspect, it relates to improved resinous and rubbery compositions prepared from thermosetting liquid formulations, and to a method for preparing the same.

Various polyhydroxy compounds, such as glycol and hydroxy-terminated polyesters, have been reacted with polyisocyanates to produce polyurethane polymers. Some of these polymers are highly elastic and similar to natural and synthetic rubbers in properties and uses. Many of them have important industrial applications, such as in the fabrication of tires, use as adhesives, and the like. According to the subject invention, these polyurethane-containing compositions are prepared in the presence of a polymerizable vinyl-substituted heterocyclic nitrogen base compound, such as 2-methyl-5-vinylpyridine, and a vinyl polymerization catalyst, such as an organic peroxide. The resulting liquid formulations are cured by heating to form novel resinous and rubbery compositions. These liquid formulations are useful in casting, molding, potting, and laminating applications. These compositions are useful as adhesives and can be used in bonding glass, metals, plastics, and the like. Because of their clear and transparent properties, they can be used as protective and decorative wrappings, and like applications.

The vinyl-substituted heterocyclic nitrogen base compounds which are especially useful in this invention are those of the pyridine, quinoline, and isoquinoline series, these compounds having the following structural formulas:

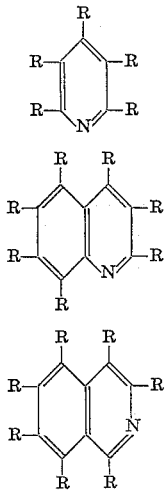

where in each compound any one of said R's is a vinyl group and the remaining R's are selected from the group consisting of H and alkyl groups, not more than 12 carbon atoms being present in the total of said alkyl groups.

Representative vinyl-substituted heterocyclic nitrogen compounds useful in the practice of this invention include: 2-vinylpyridine; 4-vinylpyridine; 2,4,6-trimethyl-5-vinylpyridine; 3,4,5,6-tetramethyl-2-vinylpyridine; 3-ethyl-5-vinylpyridine; 2-vinyl-5-ethylpyridine; 2-methyl-5-vinylpyridine; 4,6-dimethyl-2-vinylpyridine; 2,6-diethyl-4-vinylpyridine; 2-isopropyl-4-vinylpyridine; 2-vinyl-5-propylpyridine; 2-vinyl-5-butylpyridine; 2-vinyl-5-hexylpyridine; 2-vinyl-5-heptylpyridine; 2-methyl-5-undecyl-6-vinylpyridine; 2,4-dimethyl-5,6-dipentyl-3-vinylpyridine; 2-vinylquinoline; 2-vinyl-8-ethylquinoline; 4-hexyl-5-vinylquinoline; 4-dodecyl-5-vinylquinoline; 3,4,5,6-tetramethyl-2-vinylquinoline; 1-vinylisoquinoline; and the like.

The preferred vinyl-substituted nitrogen bases are compounds of the pyridine series; and the more preferred of these are those having one alkyl substituent, said alkyl substituent having one to four carbon atoms.

One or more of these vinyl-substituted monomers can be used. While thermosetting compositions can be prepared with relatively small amounts of these bases, e.g., 1 to 5 percent by weight of the reaction mixture, generally from 5 to 50 percent is preferred. These bases are admixed with the polyhydroxy compound and the polyisocyanates. These latter two reactants amount to 98 to 50 percent by weight of the reaction mixture and are commonly used in amounts such that the polyhydroxy compound is approximately equivalent to the polyisocyanate. More broadly they can be employed in amounts of about 0.5 to 1.5 equivalents of the polyhydroxy compound per equivalent of the polyisocyanate. More preferably, from 0.8 to 1.2 equivalents of the polyhydroxy reactant is used for each equivalent of the polyisocyanate.

The organic polyhydroxy compounds which can be used are those which have at least two hydroxy groups per molecule and representatively include glycols such as polyalkylene glycols, polyalkenylene glycols, and higher polyhydric alcohols such as trihydric alcohols like glycerol and tetrahydric alcohols like erythritol; polyesters also having at least two hydroxy groups are useful.

One class of glycols useful in this invention can be represented by the formula $HO(RO)_xH$ wherein R is selected from the group consisting of alkylene and alkenylene groups having 2 to 16 carbon atoms per molecule, and wherein $x$ is an integer of 1 or greater. Generally, the glycols used in this invention will have molecular weights from 60 to 10,000, and higher. Representative glycols which can be used in this invention include: ethylene glycol; 1,3-propylene glycol; 1,2-propylene glycol; 1,2-butylene glycol; 2,3-butylene glycol; 1,4-butylene glycol; 2,2-dimethyl-1,3-propanediol (neopentyl glycol); pentamethylene glycol; hexamethylene glycol; 1,2-octylene glycol; 4,5-octylene glycol; 4,5-decylene glycol; decamethylene glycol; dodecamethylene glycol; hexadecamethylene glycol; and the like. Other compounds which can be used are the condensation products of two or more of these simple glycols and broadly designated as polyalkylene glycols, such as polyethylene glycol, polypropylene glycol, poly(1,4-butylene) glycol, poly(2,3-butylene) glycol, and poly(1-phenyethylene) glycol, poly(4,5-decylene) glycol, and poly(2-methyl-2-ethyl-1,5-pentylene) glycol. So-called mixed glycols represent compounds having two or more different R groups in the above formula are also polyalkylene glycols and are typified by compounds such as ethylene-propylene glycol

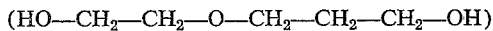
(HO—CH$_2$—CH$_2$—O—CH$_2$—CH$_2$—CH$_2$—OH)

and self condensation polymers of the latter compound.

The polyhydroxy simple esters and polyesters used in this invention can be made by reacting an excess of a glycol, such as that described above, with a dibasic carboxylic acid which generally has the formula

HOOC—R—COOH wherein R is a divalent organic radical, usually a hydrocarbon radical, having 2 to 18 carbon atoms. Polyesters can also be prepared by esterifying a hydroxy substituted acid and a polyhydroxy alcohol. Representative carboxylic acids include the alkane dibasic acids, alkene dibasic acids, cycloalkene dibasic acids, cycloalkane dibasic acids, aryl dibasic acids, or any of the foregoing types wherein the hydrocarbon radical is substituted with an alkyl, alkenyl, cycloalkyl, cycloalkenyl, or aryl radical. The dibasic carboxylic acids which will more generally be employed with have molecular weights in the range of 115 to 750, preferably 140 to 260.

Representative dibasic carboxylic acids which can be employed for reaction with the dihydroxy compounds according to the new process are succinic; monomethyl succinic; glutaric; adipic; pimelic; suberic; azelaic; sebacic; brassylic; thapsic; 6-oxoundecanedioic; octadecanedioic acid; 8-octadecenedioic acid; eicosanedioic acid; 6,8-octadecadienedioic acid; malic; and the like. Other acids include: unsaturated acids such as maleic, fumaric, glutaconic, and itaconic; the cycloalkane dicarboxylic acids such as cyclopentane-1,2-dicarboxylic and cyclopentane-1,3-dicarboxylic; aromatic dicarboxylic acids such as phthalic, isophthalic, terephthalic, naphthalene-1,2-dicarboxylic, naphthalene-1,3-dicarboxylic, naphthalene-1,4-dicarboxylic, naphthalene-1,5-dicarboxylic, naphthalene-1,8-dicarboxylic, diphenyl-2,2'-dicarboxylic, diphenyl-4,4'-dicarboxylic and diphenyl-2,4'-dicarboxylic; and aliphatic-aromatic dicarboxylic acids such as 2,6-dimethylbenzene-1,4-dicarboxylic acid, and 4,5-dimethylbenzene-1,2-dicarboxylic acid; and the like. Natural products which are particularly useful include castor oil, which comprises a glyceride of ricinoleic acid, and ricinoleyl alcohol, and mixtures thereof.

The organic polyisocyanates in general can be employed; however, the diisocyanates are usually used and preferred. Representative polyisocyanates include, among others, the following: benzene-1,3-diisocyanate; benzene-1,4-diisocyanate; hexamethylenediisocyanate; toluene-2,4-diisocyanate; toluene-2,5-diisocyanate; diphenylmethane-4,4'-diisocyanate; diphenyl-4-4'-diisocyanate; diphenyl-3,3' - dimethyl - 4,4'-diisocyanate; 2-chloropropane-1,3-diisocyanate; diphenyl-3,3' - dimethoxy - 4,4' - diisocyanate; naphthalene - 1,5 - diisocyanate; pentamethylenediisocyanate; tetramethylenediisocyanate; octamethylenediisocyanate; dimethylenediisocyanate; propylene - 1,2 - diisocyanate; benzene - 1,2,4 - triisocyanate; toluene-2,3-diisocyanate; diphenyl-2,2'-diisocyanate; naphthalene-2,7-diisocyanate; naphthalene-1,8-diisocyanate; toluene-2,4,6-triisocyanate; benzene-1,3,5-triisocyanate; benzene-1,2,3-triisocyanate; toluene-2,3,4-triisocyanate; and the like.

The vinyl polymerization catalyst is one which is employed to promote the polymerization of the vinyl-substituted heterocyclic nitrogen base compound. These catalysts are free radical promoters and representatively include the organic peroxy compounds, that is, the peroxides and hydroperoxides, such as benzoyl peroxide, n-butyl peroxide, lauroyl peroxide, tertiarybutyl peroxide, cumene peroxide, n-propyl hydroperoxide, cumene hydroperoxide, and the like. The amount of catalyst to be used in the practice of this invention will generally be from 0.01 to 10 percent by weight of the reaction mixture.

The thermosetting liquid formulations of this invention can be prepared by mixing the polyhydroxy compound, polyisocyanate, vinyl-substituted heterocyclic nitrogen base, and the vinyl polymerization catalyst. The reaction rate can be accelerated by heating, temperatures within the range of 25 to 300° C. being commonly employed. At the higher temperatures, e.g., 100 to 300° C., the reaction will be generally complete within about 10 hours; however, at the lower temperatures, e.g., 25 to 100° C., reaction periods of 1 to 400 hours will generally be necessary. When it is desired to minimize the danger of inclusion of gases, the fluid reaction mixture can be degassed prior to and during the cure period. The resulting cured thermosetting compositions will be resinous or rubbery in form and generally will have a clear or transparent appearance. These liquid formulations can be used in casting, molding, potting, and laminating applications. Many of them are especially useful as adhesives.

The use of such vinyl polymerization catalysts is essential to this invention. In the absence of such catalyst, the reaction mixture will cure to opaque solids which will not have good adhesive properties, such cured products having little strength and being crumbly in nature.

The subject invention will be further illustrated by the following examples. It should be understood that the various ingredients, amounts, temperatures, etc., are not to be construed as to unduly limit this invention.

EXAMPLE I

Hexamethylene diisocyanate, toluene 2,4-diisocyanate, castor oil and 2-methyl-5-vinylpyridine were mixed with benzoyl peroxide in parts by weight as shown in Table I. Some comparable runs were also made with styrene. The mixtures were heated at 180° F. to effect reaction. Compositions A and B were made with toluene-2,4-diisocyanate. Composition A made with styrene was transformed into an opaque, rubbery solid which shrank from the glass container. Composition B was a clear, transparent rubber. Similar differences between compositions prepared with styrene and 2-methyl-5-vinylpyridine were observed for compositions C and D. Composition D bonded well to the glass container, and would be preferable to compostiion C as an adhesive. Compositions E and F when compared with composition C show that products can be prepared from mixtures varying widely in composition and that the properties depend somewhat upon the composition of the reaction mixture, the duration of heating and catalyst level. Another comparable run, composition G, was made wherein no vinyl polymerization catalyst was used, this composition having very little strength and being very crumbly.

Table 1

|  | A | B | C | D | E | F | G |
|---|---|---|---|---|---|---|---|
| Castor Oil | 55.8 | 55.8 | 56.2 | 56.2 | 72.7 | 64.5 | 46.2 |
| Toluene 2,4-diisocyanate | 13.8 | 13.8 | 0 | 0 | 0 | 0 | 0. |
| Hexamethylene diisocyanate | 0 | 0 | 13.3 | 13.3 | 17.3 | 15.3 | 13.4 |
| 2-methyl-5-vinylpyridine | 0 | 30.0 | 0 | 30.2 | 10.0 | 20 | 30.2 |
| Styrene | 30.0 | 0 | 30.2 | 0 | 0 | 0 | 0. |
| Benzoyl peroxide | 0.3 | 0.3 | 0.3 | 0.3 | 0.1 | 0.2 | 0. |
| Temperature, °F | 180 | 180 | 180 | 180 | 180 | 180 | 180. |
| Time, hr | 65 | 65 | 65 | 65 | 45 | 45 | 1 wk. |
| Remarks | Opaque, Shrank. | Clear Shrank. | Opaque, Shrank. | Clear, Bonded to glass. | Clear, Rubbery, Crumbles easily. | Clear, Rubbery. | Clear, Crumbly. |

EXAMPLE II

Table II shows compositions prepared with a mixture of glycols. The indicated polypropylene glycols were commercial products having molecular weights of curing for and 2025. These glycols were used in conjunction with the castor oil. After curing for 45 hours at 180° F., composition A was a soft rubber. Composition B bonded very well to the glass container. Composition C bonded exceptionally will to the container, and would be superior to compostiions A and B for case bonding where good adhesion is required.

Table II

|  | A | B | C |
|---|---|---|---|
| Polypropylene glycol (mol. wt. 1025) | 0 | 0 | 33.1 |
| Polypropylene glycol (mol. wt. 2025) | 44.8 | 33.1 | 0 |
| Castor oil | 16.8 | 24.6 | 24.6 |
| Hexamethylene diisocyanate | 8.1 | 12.0 | 12.0 |
| 2-methyl-5-vinylpyridine | 30.0 | 30.0 | 30.0 |
| Benzoyl peroxide | 3.0 | 3.0 | 0.3 |
| Temperature, °F | 180 | 180 | 180 |
| Time, hr | 45 | 45 | 298.[1] |
| Remarks | soft | Rubbery, Bonded to glass. | Rubbery, Bonded to glass. |

[1] After 65 hours the composition was tacky and could not be removed from a glass mold which had been coated with mold release agent Kel-F wax (polytrifluorochloroethylene). At the end of the curing period the sample was removed only with much difficulty.

EXAMPLE III

To obtain physical test data a mixture was prepared and cured for 65 hours at 180° F. so as to form a sheet of rubbery product which could be tested for tensile strength. The mixture which was prepared had the composition, in weight percent: castor oil, 56.2; hexamethylene diisocyanate, 13.4; 2-methyl-5-vinylpyridine, 30.0; and benzoyl peroxide, 0.4. The peroxide was dissolved by heating the mixture to 55° C. Heating was then discontinued. After 20 minutes, the mixture was degassed under vacuum (less than about 0.1 atmosphere) while cooling the mixture to room temperature. After 30 minutes, the degassing was terminated, the mixture was poured into Teflon-coated pans and cured at 180° F. for 65 hours. The resulting sheet was then cut into test specimens and the following tensile properties were obtained:

| | |
|---|---|
| Tensile strength, p.s.i. | 60 |
| Elongation, percent | 72 |
| 50% modulus, p.s.i. | 96 |
| Brittle point, °F. | −58 |

Various modifications and alterations of this invention will become apparent to those skilled in the art from the foregoing discussion, and it should be understood that the subject invention is not necessarily limited to that set forth for illustrative purposes.

We claim:

1. The composition according to claim 11 wherein said polyhydroxy compound is castor oil.

2. The composition according to claim 11 wherein said vinyl-substituted heterocyclic nitrogen base is 2-methyl-5-vinylpyridine.

3. The composition according to claim 11 wherein said polyhydroxy compound is castor oil, said polyisocyanate is toluene diisocyanate, said vinyl-substituted heterocyclic nitrogen base is 2-methyl-5-vinylpyridine, and said peroxy compound is benzoyl peroxide.

4. The composition according to claim 11 wherein said polyhydroxy compound is castor oil, said polyisocyanate is hexamethylene diisocyanate, said vinyl-substituted heterocyclic nitrogen base is 2-methyl-5-vinylpyridine, and said peroxy compound is benzoyl peroxide.

5. The composition according to claim 11 wherein said polyhydroxy compound is polypropylene glycol, said polyisocyanate is toluene diisocyanate, said vinyl-substituted heterocyclic nitrogen base is 2-methyl-5-vinylpyridine, and said peroxy compound is benzoyl peroxide.

6. The method according to claim 12 wherein said polyhydroxy compound is castor oil.

7. The method according to claim 12 wherein said vinyl-substituted heterocyclic nitrogen base is 2-methyl-5-vinylpyridine.

8. The method according to claim 12 wherein said polyhydroxy compound is castor oil, said polyisocyanate is toluene diisocyanate, said vinyl-substituted heterocyclic nitrogen base is 2-methyl-5-vinylpyridine, and said peroxy compound is benzoyl peroxide.

9. The method according to claim 12 wherein said polyhydroxy compound is castor oil, said polyisocyanate is hexamethylene diisocyanate, said vinyl-substituted heterocyclic nitrogen base is 2-methyl-5-vinylpyridine, and said peroxy compound is benzoyl peroxide.

10. The method according to claim 12 wherein said polyhydroxy compound is polypropylene glycol, said polyisocyanate is toluene diisocyanate, said vinyl-substituted heterocyclic nitrogen base is 2-methyl-5-vinylpyridine, and said peroxy compound is benzoyl peroxide.

11. As a new composition, the product formed by reacting an organic polyhydroxy compound with an organic polyisocyanate in the presence of a vinyl-substituted heterocyclic nitrogen base and a vinyl polymerization catalyst, wherein said polyhydroxy compound is selected from the group consisting of castor oil, ethylene glycol, 1,3-propylene glycol, 1,2-propylene glycol, 1,2-butylene glycol, 2,3-butylene glycol, 1,4-butylene glycol, 2,2-dimethyl-1,3-propanediol, pentamethylene glycol, hexamethylene glycol, 1,2-octylene glycol, 4,5-octylene glycol, 4,5-decylene glycol, decamethylene glycol, dodecamethylene glycol, hexadecamethylene glycol, polyethylene glycol, polypyropylene glycol, poly(1,4-butylene) glycol, poly(2,3-butylene) glycol, poly(1-phenylethylene) glycol, poly(4,5-decylene) glycol, poly(2-methyl - 2 - ethyl-1,5-pentylene) glycol, ethylene-propylene glycol, and esters of such glycols formed by reacting the same with a carboxylic acid selected from the group consisting of succinic acid, monomethyl succinic acid, glutaric acid, adipic acid, pimelic acid, suberic acid, azelaic acid, sebacic acid, brassylic acid, thapsic acid, 6-oxoundecanedioic acid, octadecanedioic acid, 8-octadecenedioic acid, eicosanedioic acid, 6,8-octadecadienedioic acid, malic acid, maleic acid, fumaric acid, glutaconic acid, itaconic acid, cyclopentane-1,2-dicarboxylic acid, cyclopentane-1,3-dicarboxylic acid, phthalic acid, isophthalic acid, terephthalic acid, naphthalene-1,2-dicarboxylic acid, naphthalene-1,3-dicarboxylic acid, naphthalene-1,4-dicarboxylic acid, naphthalene-1,5-dicarboxylic acid, naphthalene-1,8-dicarboxylic acid, diphenyl-2,2′-dicarboxylic acid, diphenyl-4,4′-dicarboxylic acid, diphenyl-2,4′-dicarboxylic acid, 2,6-dimethylbenzene-1,4-dicarboxylic acid, and 4,5-dimethyl-benzene-1,2-dicarboxylic acid, said polyisocyanate being selected from the group consisting of benzene-1,3-diisocyanate, benzene - 1,4 - diisocyanate, hexamethylenediisocyanate, toluene-2,4-diisocyanate, toluene - 2,5 - diisocyanate, diphenylmethane-4,4′-diisocyanate, diphenyl-4,4′-diisocyanate, diphenyl-3,3′-dimethyl-4,4′-diisocyanate, diphenyl-3,3′-dimethyl - 4,4′ - diisocyanate, 2 - chloropropane-1,3-diisocyanate, diphenyl - 3,3′-dimethoxy-4,4′-diisocyanate, naphthalene-1,5-diisocyanate, pentamethylenediisocyanate, tetramethylenediisocyanate, octamethylenediisocyanate, dimethylenediisocyanate, propylene-1,2-diisocyanate, benzene - 1,2,4 - triisocyanate, toluene - 2,3-diisocyanate, diphenyl-2,2′-diisocyanate, naphthalene - 2,7 - diisocyanate, naphthalene-1,8-diisocyanate, toluene-2,4,6-triisocyanate, benzene-1,3,5-triisocyanate, benzene - 1,2,3-triisocyanate, and toluene-2,3,4-triisocyanate, said vinyl-substituted heterocyclic nitrogen base being selected from the group consisting of 2-vinylpyridine, 4-vinylpyridine, 2,4,6-trimethyl - 5 - vinylpyridine, 3,4,5,6-tetramethyl-2-vinylpyridine, 3-ethyl-5-vinylpyridine, 2-vinyl - 5 - ethylpyridine, 2-methyl-5-vinylpyridine, 4,6 - dimethyl - 2-vinylpyridine, 2,6-diethyl - 4 - vinylpyridine, 2-isopropyl-4-vinylpyridine, 2-vinyl-5-propylpyridine, 2-vinyl-5-butylpyridine, 2-vinyl-5-hexylpyridine, 2-vinyl - 5 - heptylpyridine, 2-methyl-5-undecyl-6-vinylpyridine, 2,4 - dimethyl - 5,6 - dipentyl-3-vinylpyridine, 2-vinyl-quinoline, 2-vinyl-8-ethylquinoline, 4-hexyl - 5 - vinylquinoline, 4 - dodecyl-5-vinylquinoline, 3,4,5,6-tetramethyl-2-vinylquinoline, and 1-vinylisoquinoline, said catalyst being selected from the group consisting of benzoyl peroxide, n-butyl peroxide, lauroyl peroxide, tertiarybutyl peroxide, cumene peroxide, n-propyl hydroperoxide, and cumene hydroperoxide, wherein the total amount of said polyhydroxy and polyisocyanate compounds is 50 to 98 weight percent with 0.5 to 1.5 equivalents of said polyhydroxy compound being used per equivalent of said polyisocyanate compound, said vinyl-substituted heterocyclic nitrogen base being used in the amount of 1 to 50 weight percent, and said catalyst being used in the amount of 0.01 to 10 weight percent, said weight percents being based on the total weight of the reaction mixture.

12. In a method which comprises mixing an organic polyhydroxy compound with an organic polyisocyanate, the improvement which comprises carrying out said mixing in the presence of a vinyl-substituted heterocyclic nitrogen base and a vinyl polymerization catalyst, and heating the resulting mixture, wherein said polyhydroxy compound is selected from the group consisting of castor oil, ethylene glycol, 1,3-propylene glycol, 1,2-propylene glycol, 1,2-butylene glycol, 2,3-butylene glycol, 1,4-butylene glycol, 2,2-dimethyl-1,3-propanediol, pentamethylene glycol, hexamethylene glycol, 1,2-octylene glycol, 4,5-octylene glycol, 4,5-decylene glycol, decamethylene glycol, dodecamethylene glycol, hexadecamethylene glycol, polyethylene glycol, polypropylene glycol, poly(1,4-butylene) glycol, poly(2,3-butylene) glycol, poly(1-phenyethylene) glycol, poly(4,5-decylene) glycol, poly(2-methyl-2-ethyl-1,5-pentylene) glycol, ethylene-propylene glycol, and esters of such glycols formed by reacting the same with a carboxylic acid selected from the group consisting of succinic acid, monomethyl succinic acid, glutaric acid, adipic acid, pimelic acid, suberic acid, azelaic acid, sebacic acid, brassylic acid, thapsic acid, 6-oxoundecanedioic acid, octadecanedioic acid, 8-octadecenedioic acid, eicosanedioic acid, 6,8-octadecadienedioic acid, malic acid, maleic acid, fumaric acid, glutaconic acid, itaconic acid, cyclopentane-1,2-dicarboxylic acid, cyclopentane-1,3-dicarboxylic acid, phthalic acid, isophthalic acid, terephthalic acid, naphthalene-1,2-dicarboxylic acid, naphthalene-1,3-dicarboxylic acid, naphthalene-1,4-dicarboxylic acid, naphthalene-1,5-dicarboxylic acid, naphthalene-1,8-dicarboxylic acid, diphenyl-2,2'-dicarboxylic acid, diphenyl-4,4'-dicarboxylic acid, diphenyl-2,4'-dicarboxylic acid, 2,6-dimethylbenzene-1,4-dicarboxylic acid, and 4,5-dimethyl-benzene-1,2-dicarboxylic acid, said polyisocyanate being selected from the group consisting of benzene-1,3-diisocyanate, benzene-1,4-diisocyanate, hexamethylenediisocyanate, toluene-2,4-diisocyanate, toluene-2,5-diisocyanate, diphenylmethane-4,4'-diisocyanate, diphenyl-4,4'-diisocyanate, diphenyl-3,3'-dimethyl-4,4'-diisocyanate, diphenyl-3,3'-dimethyl-4,4'-diisocyanate, 2-chloropropane-1,3-diisocyanate, diphenyl-3,3'-dimethoxy-4,4'-diisocyanate, naphthalene-1,5-diisocyanate, pentamethylenediisocyanate, tetramethylenediisocyanate, octamethylenediisocyanate, dimethylenediisocyanate, propylene-1,2-diisocyanate, benzene-1,2,4-triisocyanate, toluene-2,3-diisocyanate, diphenyl-2,2'-diisocyanate, naphthalene-2,7-diisocyanate, naphthalene-1,8-diisocyanate, toluene-2,4,6-triisocyanate, benzene-1,3,5-triisocyanate, benzene-1,2,3-triisocyanate, and toluene-2,3,4-triisocyanate, said vinyl-substituted heterocyclic nitrogen base being selected from the group consisting of 2-vinylpyridine, 4-vinylpyridine, 2,4,6-trimethyl-5-vinylpyridine, 3,4,5,6-tetramethyl-2-vinylpyridine, 3-ethyl-5-vinylpyridine, 2-vinyl-5-ethylpyridine, 2-methyl-5-vinylpyridine, 4,6-dimethyl-2-vinylpyridine, 2,6-diethyl-4-vinylpyridine, 2-isopropyl-4-vinylpyridine, 2-vinyl-5-propylpyridine, 2-vinyl-5-butylpyridine, 2-vinyl-5-hexylpyridine, 2-vinyl-5-heptylpyridine, 2-methyl-5-undecyl-6-vinylpyridine, 2,4-dimethyl-5,6-dipentyl-3-vinylpyridine, 2-vinyl-quinoline, 2-vinyl-8-ethylquinoline, 4-hexyl-5-vinylquinoline, 4-dodecyl-5-vinylquinoline, 3,4,5,6-tetramethyl-2-vinylquinoline, and 1-vinylisoquinoline, said catalyst being selected from the group consisting of benzoyl peroxide, n-butyl peroxide, lauroyl peroxide, tertiarybutyl peroxide, cumene peroxide, n-propyl hydroperoxide, and cumene hydroperoxide, wherein the total amount of said polyhydroxy and polyisocyanate compounds is 50 to 98 weight percent with 0.5 to 1.5 equivalents of said polyhydroxy compound being used per equivalent of said polyisocyanate compound, said vinyl-substituted heterocyclic nitrogen base being used in the amount of 1 to 50 weight percent, and said catalyst being used in the amount of 0.01 to 10 weight percent, said weight percents being based on the total weight of the reaction mixture.

References Cited in the file of this patent

UNITED STATES PATENTS

| 2,650,212 | Windemuth | Aug. 25, 1953 |
| 2,867,278 | Mallory et al. | Jan. 6, 1959 |
| 2,894,919 | Simon et al. | July 14, 1959 |

OTHER REFERENCES

Bayer: "Rubber Chem. and Techn.," 23, 812–35 (1950).

Heiss et al.: "Ind. and Eng. Chem.," 46, #7, 1498–1503 (1954).

Gregory: "Uses and Applications of Chemicals and Related Materials," volume I, page 90 (1939), Reinhold Pub. Corp., New York.